United States Patent [19]
Crandall, Jr.

[11] Patent Number: 5,757,530
[45] Date of Patent: May 26, 1998

[54] SIGNAL TRANSMITTER WITH AUTOMATIC OUTPUT CONTROL AND SYSTEMS UTILIZING THE SAME

[75] Inventor: William F. Crandall, Jr., Sausalito, Calif.

[73] Assignee: Talking Signs, Inc., Baton Rouge, La.

[21] Appl. No.: 754,275

[22] Filed: Nov. 20, 1996

[51] Int. Cl.$^6$ .................................................. H04B 10/04
[52] U.S. Cl. .......................... 359/182; 359/149; 359/187; 381/172; 250/214 AL
[58] Field of Search .................................. 359/149–150, 359/172, 180, 182, 187; 381/172, 77; 250/214 AL; 340/825–72

[56] References Cited

U.S. PATENT DOCUMENTS

| | | | |
|---|---|---|---|
| 4,648,131 | 3/1987 | Kawaguchi et al. | 455/606 |
| 4,757,303 | 7/1988 | Scheidweiler | 340/501 |
| 4,977,619 | 12/1990 | Crimmins | 455/607 |
| 5,012,086 | 4/1991 | Barnard | 250/222.1 |
| 5,027,433 | 6/1991 | Menadier et al. | 455/606 |
| 5,095,382 | 3/1992 | Abe | 359/189 |
| 5,359,448 | 10/1994 | Laszlo et al. | 359/180 |
| 5,455,702 | 10/1995 | Reed et al. | 359/152 |
| 5,495,357 | 2/1996 | Osterhout | 359/152 |
| 5,596,648 | 1/1997 | Fast | 381/77 |
| 5,623,358 | 4/1997 | Madey | 359/172 |

OTHER PUBLICATIONS

Talking Signs—Brochure—2 pp.—Undated.

Talking Signs, Inc.—"Overview" —1 p. and Accessible City Project, San Francisco—1 p.—All Undated.

Letter from City and County of San Francisco—1 p.—Dated Mar. 1, 1993.

Talking Signs, Inc.—"For Immediate Release" 1 p. Undated.

"Winning Solutions—1994 PTI Technology Achievement Awards" —Brochure—2 pp.—Undated.

Excerpt from San Francisco Examiner—Bill Mandel Column—1 p. —Present copy Undated.

Smith-Kettlewell Eye Research Institute, Bart & Muni— News Release—3 pp.—Sep. 9, 1994.

Article from the Urban Transportation Monitor—1 p.—Sep. 30, 1994.

Reprint from Identity Magazine—4 pp.—Reprinted from Mar./Apr. 1994 issue.

The Beach News, vol. 9, No. 2, p. 5 –1 p.—Jan. 12, 1995.

Excerpt from San Francisco Examiner—"New aid for the blind" —1 p.—Present copy Undated.

Newspaper article "Clearing way for the blind" —1 p.—Present copy Undated.

Apparent excerpt from Identity Magazine "A Light in the Darkness" —1 p.—Present copy Undated.

Excerpt from Cape Cod Times "High-tech signs 'talk' to blind" —1 p.—Oct. 6, 1994.

(List continued on next page.)

*Primary Examiner*—Kinfe-Michael Negash
*Attorney, Agent, or Firm*—John F. Sieberth; R. Andrew Patty, II

[57] ABSTRACT

Described are apparatus for transmitting light wave signals, the apparatus being capable of adjusting their signal strength to automatically adapt to changes in the ambient light conditions of their surrounding environment. In one embodiment, the apparatus for transmitting lightwave signals comprises (a) an emitter for sending a frequency modulated lightwave signal of variable intensity, (b) a light energy receiver for detecting a change in the level of surrounding ambient light energy and for producing a response to such change in proportion to the change detected, and (c) a controller for adjusting, directly or indirectly, the frequency modulated lightwave signal in response to the light energy receiver response to the change detected. Audio transmission systems employing apparatus of this invention are also described.

38 Claims, 9 Drawing Sheets

BLOCK DIAGRAM OF FM TRANSMITTER WITH AMBIENT LIGHT DETECTION FOR OUTPUT CONTROL.

OTHER PUBLICATIONS

Excerpt from Manchester Evening News "Bosses help by talking shop" —1 p.—Nov. 6, 1993.

Talking Signs, Inc.—Technical Data sheet—1 p.—Undated.

Report: Smith–Kettlewell Eye Research Institute, Rehabilitation Engineering Center—11 pp.—Mar. 15, 1991.

Paper entitled "Infrared Remote Signage Application for Transit Accessibility" —3 pp.—Undated.

Letter—Royal National Institute for the Blind—1 p.—Jan. 16, 1995.

Resolution of American Council of the Blind—1 p.—Approved Jul. 6, 1990.

Resolution of Board of Supervisors of San Francisco—3 pp. (on 2 sheets)—Approved Apr. 24, 1992.

Brochure headed "Talking Signs® . . . they speak for themselves" —8 pp.—Copyright 1994.

BLOCK DIAGRAM OF FM TRANSMITTER WITH AMBIENT LIGHT DETECTION FOR OUTPUT CONTROL.

SCHEMATIC DIAGRAM OF FM TRANSMITTER WITH AMBIENT LIGHT DETECTION FOR OUTPUT CONTROL.

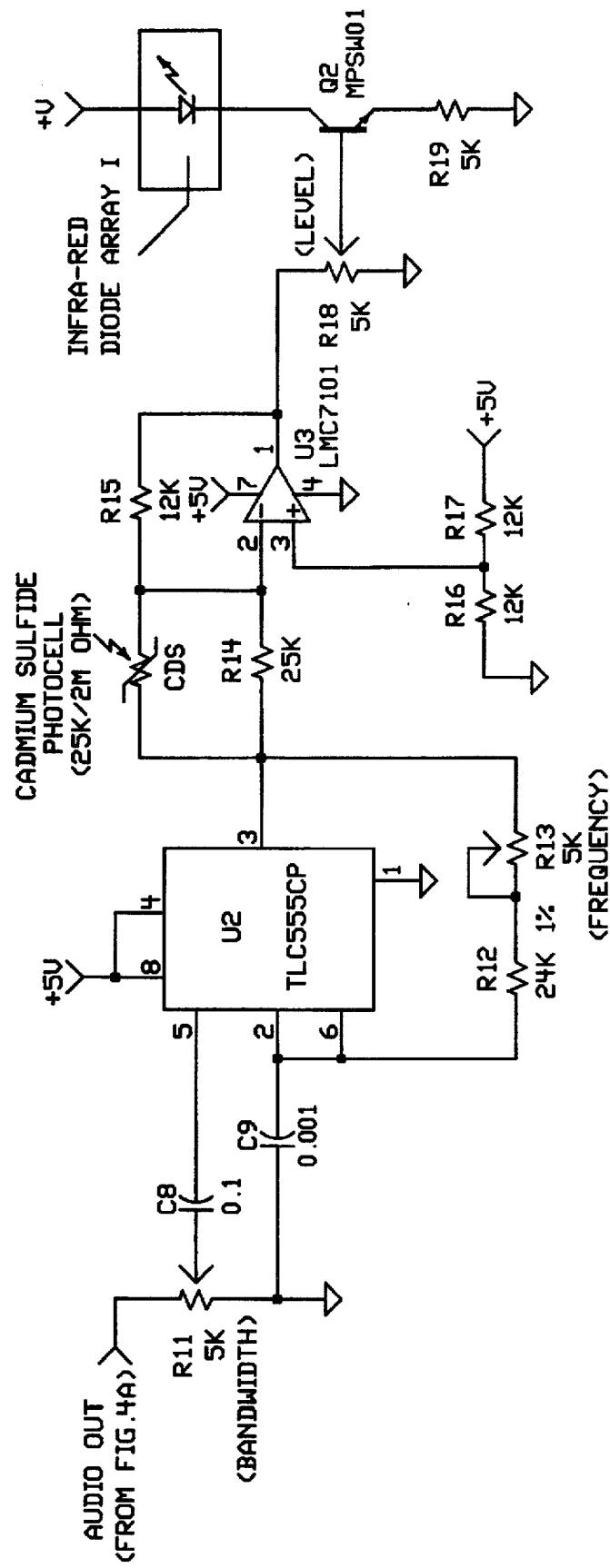
FIG. 2B  SCHEMATIC DIAGRAM OF FM TRANSMITTER WITH AMBIENT LIGHT DETECTION FOR OUTPUT CONTROL.

RECEIVER FRONT END BLOCK DIAGRAM

TRF FM RECEIVER WITH NOISE OPERATED SQUELCH BLOCK DIAGRAM

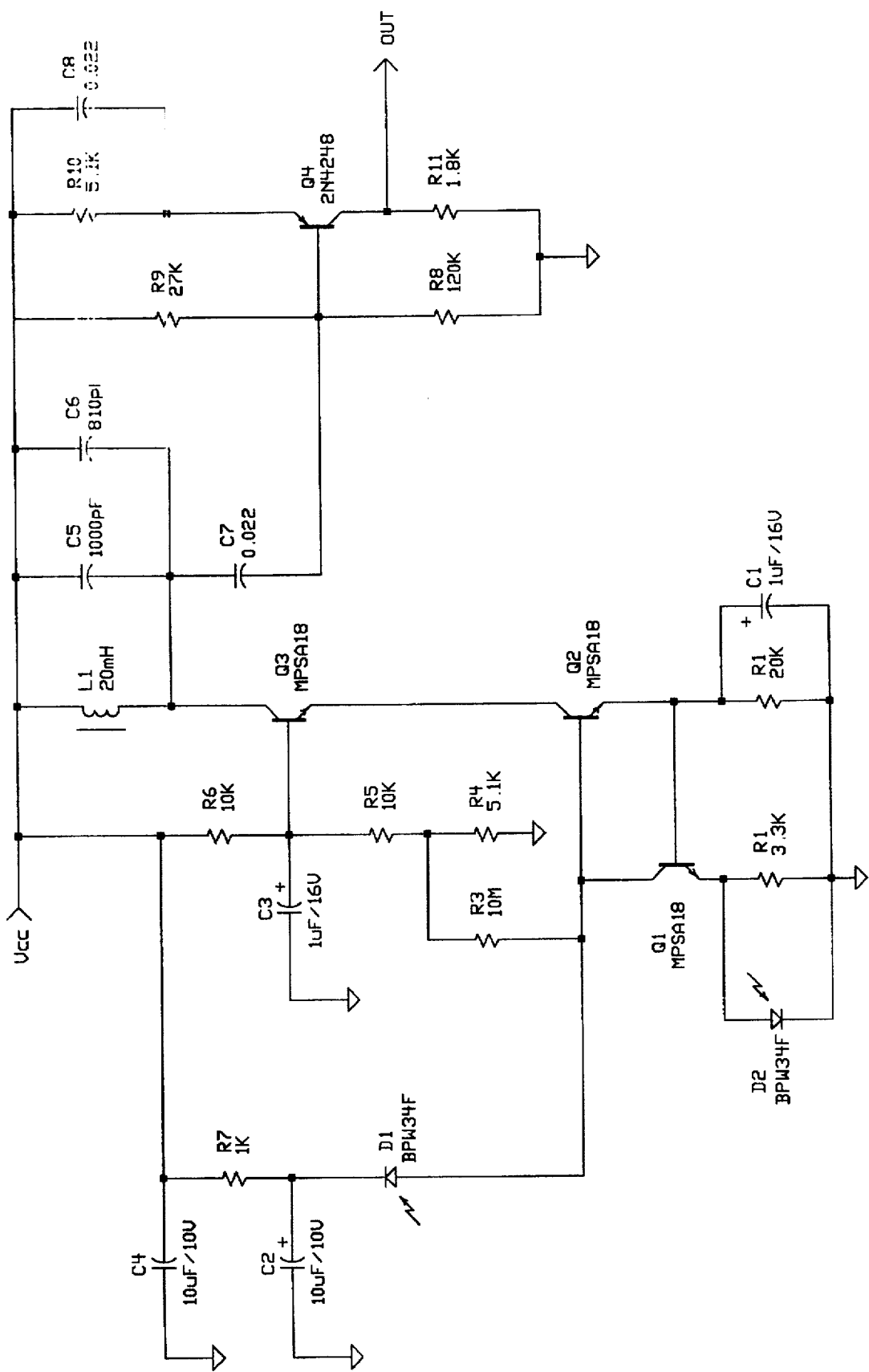
FIG. 5 RECEIVER FRONT END SCHEMATIC DIAGRAM

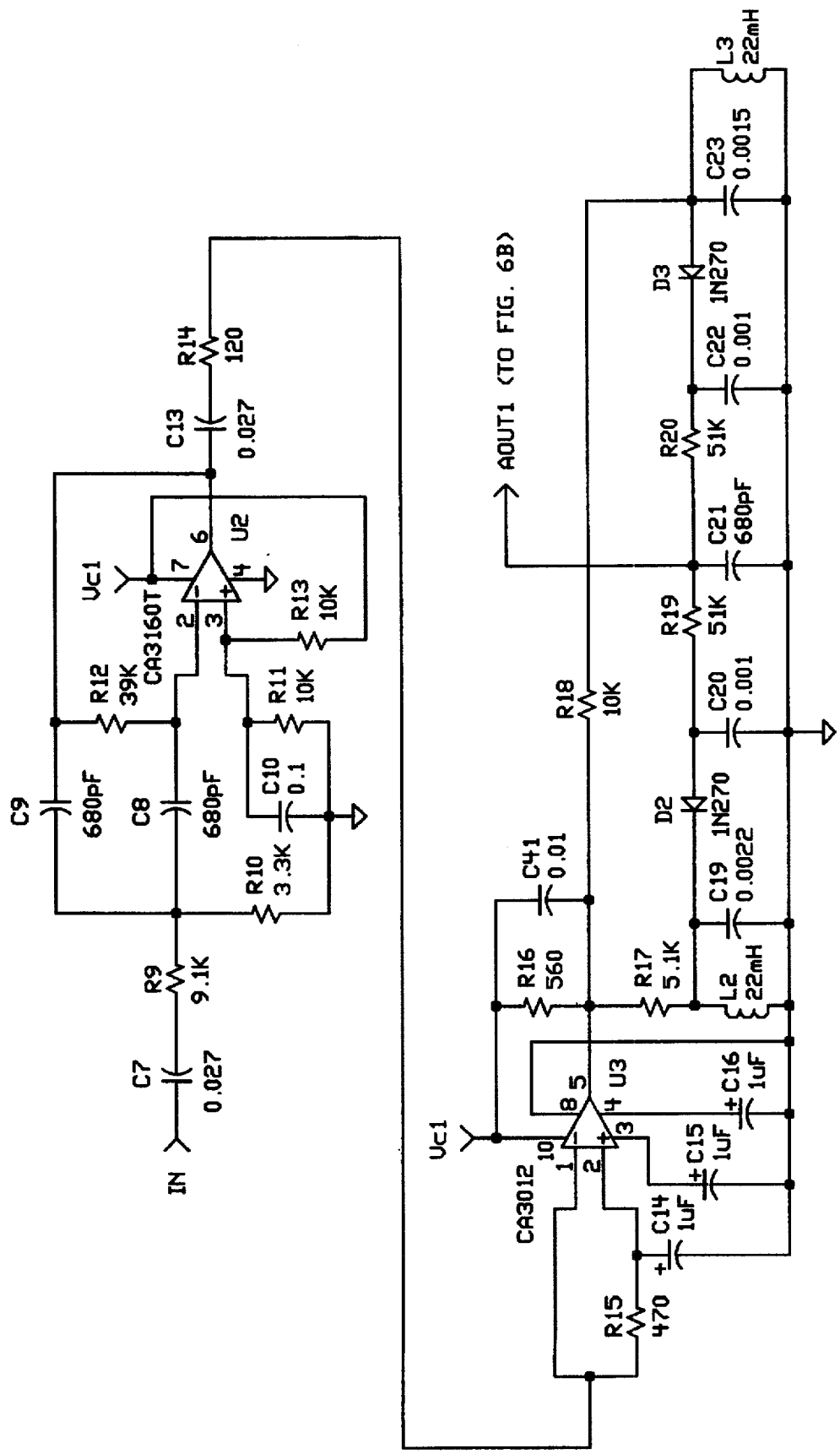
FIG. 6A TRF FM RECEIVER WITH NOISE OPERATED SQUELCH SCHEMATIC DIAGRAM

TRF FM RECEIVER WITH NOISE OPERATED SQUELCH SCHEMATIC DIAGRAM

TRF FM RECEIVER WITH NOISE OPERATED SQUELCH SCHEMATIC DIAGRAM

SIGNAL TRANSMITTER WITH AUTOMATIC OUTPUT CONTROL AND SYSTEMS UTILIZING THE SAME

TECHNICAL FIELD

This invention relates to optoelectronic signal transmitters and audio transmission systems adapted to automatically sense changes in surrounding ambient light conditions and to adjust their signal output in response to those changes.

BACKGROUND

The use of lightwave signals to transmit information between an electronic transmitter and an electronic receiver across air space has evolved significantly over the past several decades. The basic technology allows quick, wireless transmission and communication of large amounts of information from one place to another. However, because the technology employs some of the same types of lightwaves (e.g., infrared) which are present in the surrounding environment, signal noise created by environmental light sources can interfere with the desired lightwave signals, and therefore the proper functioning, of these technologies. One recently disclosed method dealing with this problem involves increasing the ambient light noise filtering capacity of the signal receiver. See in this regard, commonly owned and co-pending U.S. patent application Ser. No. 08/496,970 filed on Jun. 30, 1995 (now U.S. Pat. No. 5,623,358 issued on Apr. 22, 1997). While these measures constitute important steps in improving desired lightwave signal processing, prior developments have proven inadequate in regulating the effective range of the transmitters employed to optimize the signal for the particular application at hand to insure a constant, reproducible, reliable range of effective transmission.

Accordingly, a need exists for lightwave signal transmitters, and systems employing such transmitters, which are capable of adjusting their signal strength to automatically adapt to changes in the ambient light conditions of their surrounding environment.

This invention is deemed to fulfill this need in a highly efficient manner.

SUMMARY OF THE INVENTION

In one embodiment, this invention provides apparatus for transmitting lightwave signals which comprises (a) an emitter for sending a frequency modulated lightwave signal of variable intensity, (b) a light energy receiver for detecting a change in the level of surrounding ambient light energy and for producing a response to such change in proportion to the change detected, and (c) a controller for adjusting, directly or indirectly, the frequency modulated lightwave signal in response to the light energy receiver response to the change detected.

In another embodiment of this invention, an audio transmission system is provided which comprises (a) a sound storage and retrieval device for controllably storing and transmitting an audio signal, (b) a modulator for modulating the frequency of the audio signal to produce a modulated output signal, (c) a light energy receiver for detecting a change in the level of surrounding ambient light energy and for producing a response to such change in proportion to the change detected, (d) a controller for adjusting the frequency modulated output signal in response to the light energy receiver response to the change detected, and (e) an emitter for converting the adjusted, frequency modulated output signal into a frequency modulated lightwave signal. In a preferred embodiment, the system further comprises at least one electronic receiver for receiving the lightwave signal and converting it into sound. Preferably, the electronic receiver is a portable directional receiver. In a particularly preferred embodiment, the electronic receiver comprises a non-visual communicator, a self-contained source of electrical energy, a detector for receiving the lightwave signal, and electronics comprising an active sink for ambient light-induced steady state detector photocurrent, a primary PIN photodiode operated in the photoresistive mode, and a secondary PIN photodiode operated in the photovoltaic mode, the electronics converting the sensed signal into intelligible non-visual communication emanating from the communicator both in the presence and in the absence of an ambient background of light energy, and the electronic receiver being effective as the sensed signal approaches the shot noise detection limit of the primary PIN photodiode in the presence of a steady state photocurrent.

These and other embodiments and features of the invention will become still further apparent from the ensuing description, appended claims and accompanying drawings.

BRIEF DESCRIPTION OF THE DRAWINGS

FIG. 2B is the other half of the detailed schematic diagram set forth in FIG. 2A.

FIG. 5 is a detailed schematic diagram of the electronics of the front end of a typical receiver of this invention.

FIGS. 6A, 6B and 6C, taken together, are a detailed schematic diagram of the electronics of a means in the receiver for filtering and detecting the received signal and for squelching ambient background noise as well as intrinsic electronic circuit noise.

In FIGS. 1–2B, like letters and/or numerals are used to refer to like parts among FIGS. 1–2B. Likewise, in FIGS. 3–6C, like letters and/or numerals are used to refer to like parts among FIGS. 3–6C.

DESCRIPTION OF PREFERRED EMBODIMENTS

Figure 1:
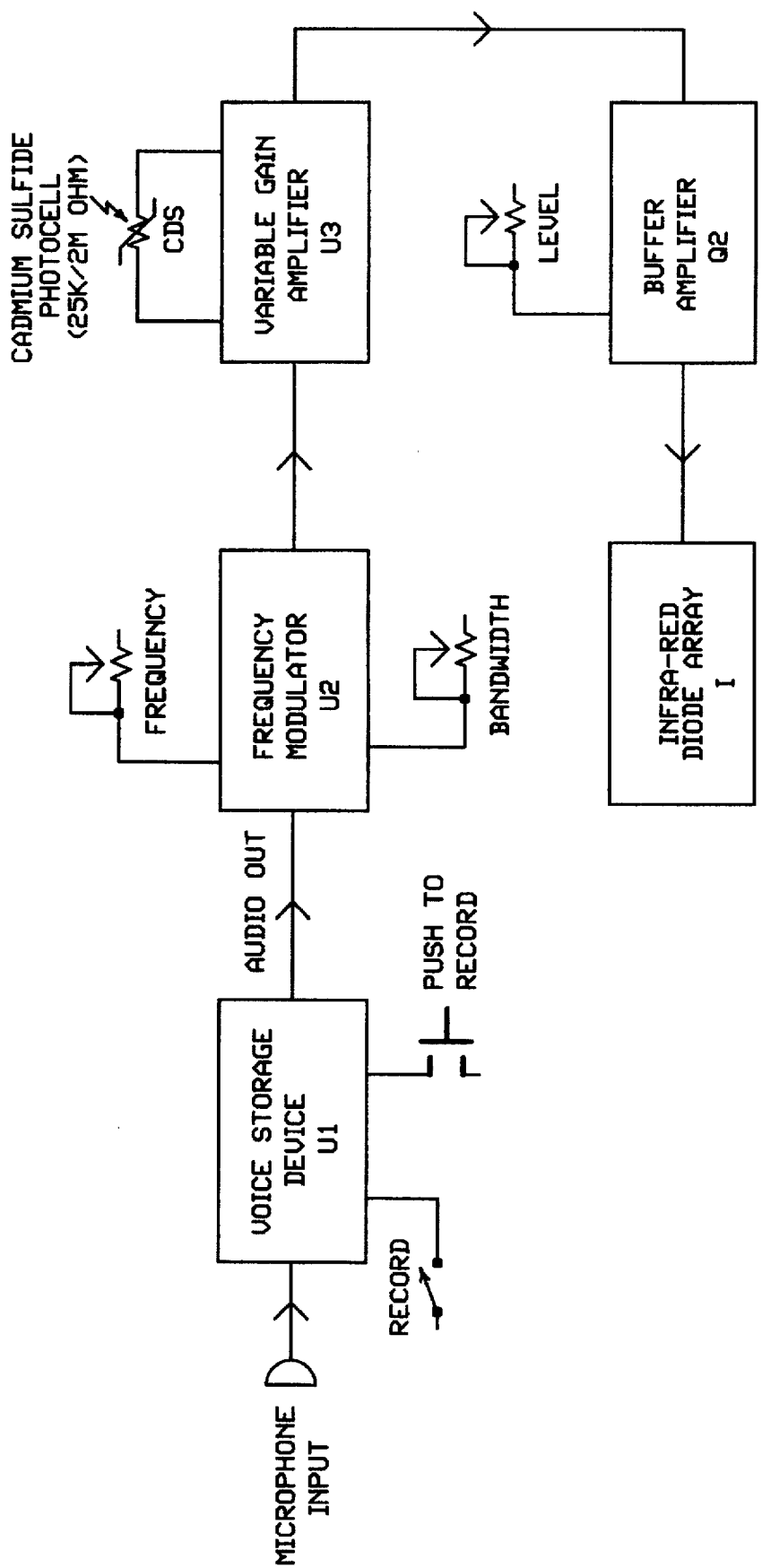
FIG. 1 is a block diagram of the control logic of a preferred apparatus of this invention.

The transmitters of this invention may be single or multi-channel transmitters (i.e., may transmit signals at one or more carrier frequencies), and will include emitters comprised of one or more diodes. The lightwave used may be any within the spectrum, but is preferably infrared. The emitter is one or more infrared diode arrays in particularly preferred embodiments. It is also preferred that each diode within an array deliver a frequency modulated infrared signal (preferably continuous) in a pattern approximate to that of a cone and having a beam width in the range of about 10° to about 60° and a modulated frequency of about 25 KHz, a band width in the range of about 3 to about 6 KHz, and an infrared carrier frequency in the range of about 850 to about 950 nanometers. If desired, the signal may be conditioned to have a subcarrier deviation of about 2.5 kHz and a modulation index of 0.76. While the above specified frequencies, band widths and carrier frequencies are preferred, various combinations of different frequencies, band widths and carrier frequencies may be used and are within the scope of this invention, so long as the effective transmission of a signal is accomplished. The emitter of the transmitter can be placed at suitable locations so that, for example, a sight-impaired user of the electronic receiver of this invention can receive the signal and convert it into sound, to thereby be led to the desired location by intelligible communication generated in the electronic receiver. Examples of such an application of this invention are further described in commonly owned and co-pending U.S. patent application Ser. No. 08/754,240 (Attorney Docket No. S-604), filed contemporaneously herewith.

The light energy receiver of this invention may be any device capable of detecting a change in the level of surrounding ambient light energy and producing a response to such change in proportion to the change detected. The response produced may take the form of a change in resistance at the terminal location of the receiver in the circuitry, or it may take the form of other changes in the electrical characteristics of the receiver at such terminal. For example, a change in voltage in the case of photogenerative devices, conductivity in the case of a photoresistive device, a change in reactance in the case of photoreactive devices (i.e., devices which change either capacitance or inductance as a function of changes in light energy detected), etc. may also be generated by the light energy receiver, as long as the response produced is in some proportion (directly or inversely, linearly or nonlinearly) to the detected changes in ambient light levels. Preferably, the light energy receiver is a photocell having at resistance which is inversely proportional to the ambient light energy detected. Particularly preferred is a cadmium sulfide photocell having these resistance characteristics and a nominal resistance in the range of about 25 Kilohms to about 2 Megohms.

The controller of this invention may be any device capable of adjusting, directly or indirectly, the strength of the frequency modulated lightwave signal in response to the light energy receiver response to the change detected. By directly or indirectly it is meant that the controller may operate directly to control the strength of the lightwave signal produced by the emitter within the emitter itself, or may operate indirectly by adjusting the strength of the signal input to the emitter. The magnitude of the adjustment will depend in part upon the particular controller employed. Preferably, the controller is a variable gain amplifier producing a gain magnitude as further described below.

The audio storage and retrieval device of this invention capable of controllably storing and transmitting an audio signal, although an integrated circuit as described below is preferred. Likewise, the modulator of this invention may be any device capable of modulating the frequency of the audio signal to produce a modulated output signal, although a frequency modulator circuit as described below is preferred.

Referring now to FIG. 1, the voice or sound message to be transmitted is stored in the sound storage device in the form of integrated circuit U1. The sound is stored via the microphone depicted by placing switch SW1 in the RECORD position (closed) and pressing the PUSH TO RECORD switch SW2 while playing or speaking the desired sound into the microphone. Circuit U1 stores the message into internal memory and continually transmits the message to the frequency modulator in the form of integrated circuit U2 when switch SW2 is released and switch SW1 is opened.

The audio signal from sound storage circuit U1 is frequency modulated by frequency modulator circuit U2. In the device depicted, the nominal carrier or center frequency is 25 KHz and the nominal modulation bandwidth is 6 KHz. The carrier frequency is set by a potentiometer R13 and the modulator bandwidth is set by a potentiometer R11.

Figure 2A:
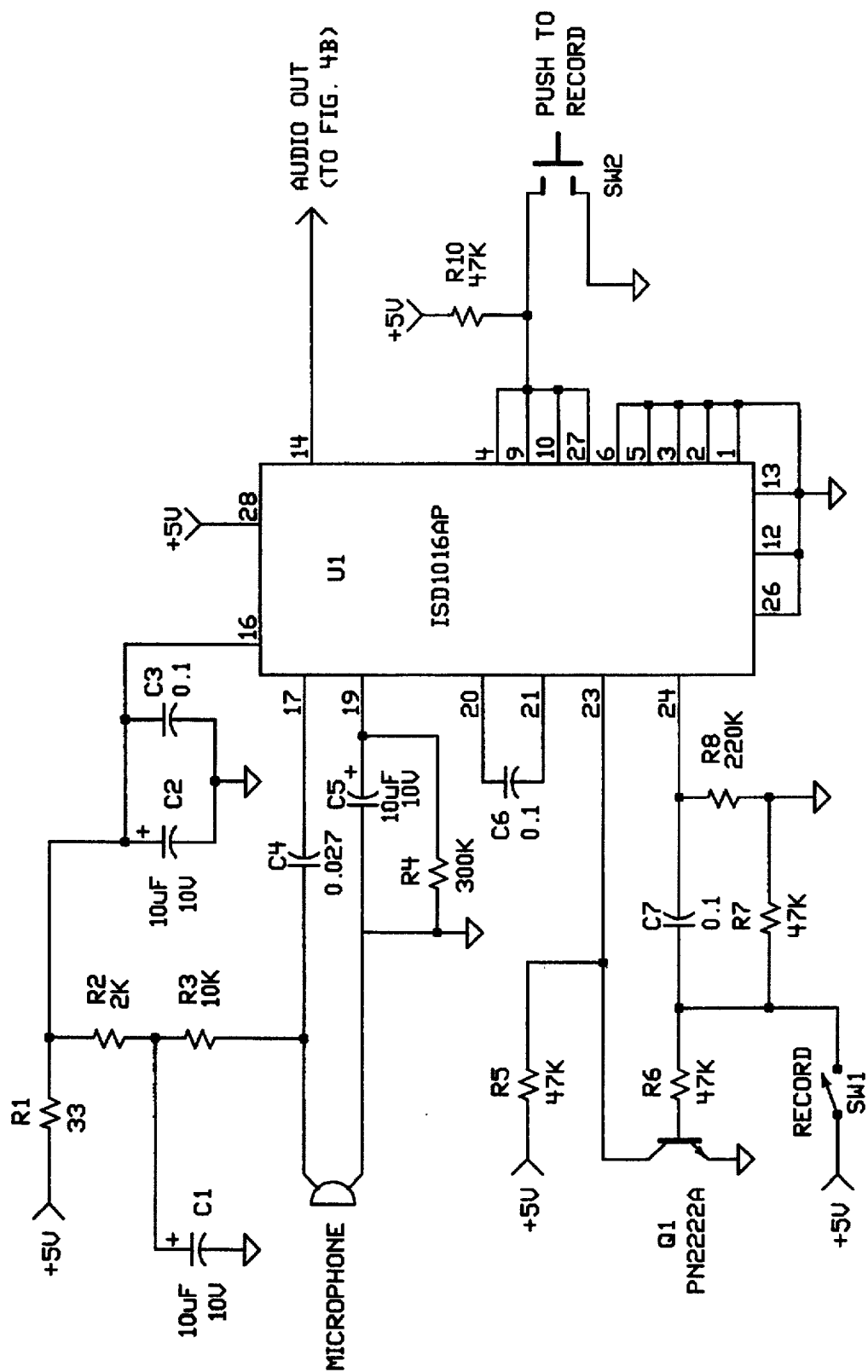
FIG. 2A is one half of a detailed schematic diagram of the apparatus of FIG. 1.

The modulated output signal from frequency modulator circuit U2 is input to a variable gain modifier in the form of an integrated circuit U3. The gain of this network is determined by a cadmium sulfide photocell CDS which is placed in the surrounding environment periodically exposed to ambient light. As depicted, photocell CDS has a nominal resistance of 25 Kilohms for high illumination conditions (i.e., light), and 2 Megohms for non-illuminated conditions (i.e., dark). The nominal gain of gain circuit U3 is determined by the values of R14 and R15 on FIG. 2B. The magnitude gain of the amplifier network can be expressed by the following formula:

$$\text{Gain Magnitude} = R15/[(R14 \times Rcds)/(R14+Rcds)]$$

where Rcds equals the nominal resistance of photocell CDS. With reference to the values of R14 and R15 shown on FIG. 2B, it will be seen that the nominal gain magnitude of the amplifier is 1.0 and 0.5 for fully illuminated and non-illuminated ambient light conditions, respectively. The gain magnitude varies from 1.0 to 0.5 for conditions between full illumination and no illumination, which is the desired operation since non-illuminated conditions (e.g., night) require a reduced signal strength so that the signal sent to the FM receiver is optimized for efficient reception within a particular signal range under the particular ambient illumination conditions at hand. As discussed below, it is preferred that the gain magnitude be in inverse proportion to the electronic receiver sensitivity for various ambient light conditions.

The frequency modulated output from circuit U3 is input to a buffer amplifier in the form of transistor Q2. The level of the signal applied to the base of transistor Q2 is determined by potentiometer R18. An infrared diode array I is driven by transistor Q2, and the maximum value of the modulation signal current flowing in the diode array is determined by the value of R19. For the values depicted on FIG. 2B, the maximum peak current is nominally 200 milliamperes.

As previously noted, it is preferred that the transmitter of this invention be used in combination with an electronic receiver for receiving the lightwave signal and converting it into sound. The electronic receivers of the invention are especially adapted for use with one or more single channel transmitters of this invention. The electronic receivers are comprised of four basic components, (i) a non-visual communicator, (ii) a self-contained source of electrical energy, (iii) a detector for receiving the lightwave signal, and (iv) electronics for converting the sensed signal into intelligible non-visual communication emanating from the communicator both in the presence and in the absence of an ambient background of light energy, the electronics including, among other things, a primary PIN photodiode. The electronic receiver also should be effective as the sensed signal approaches the shot noise detection limit of the primary PIN photodiode in the presence of a steady state photocurrent.

The non-visual communicator of the electronic receiver can be of various types such as a Morse code cell, a tactile braille communicating device or any other electromechanical conversion device. Preferably however it is a small audio speaker or earphone system. When the communicator is an audio or earphone speaker system, the electronics of the receiver converts the sensed signal into intelligible speech emanating from the speaker system by converting the signal into an amplified time-varying detector signal photocurrent and delivering the amplified photocurrent to the speaker system to actuate the same.

As the self-contained source of electrical energy, the electronic receiver will usually include one or more small electrical batteries. However, a suitable photovoltaic cell system for converting light energy into electrical energy for the electronic receiver may be employed.

Referring now to the preferred embodiment of the electronic receiver depicted at FIGS. 3-6C, a signal from the array of single channel emitters of this invention combined with ambient background radiation is received by primary PIN detector, D1. A auxiliary PIN detector, D2, receives ambient background radiation and cancels the ambient noise signal from primary PIN detector, D1, using active sink network of Q1. In essence, shot noise current due to the main PIN photodiode, the active sink and the auxiliary PIN photodiode are non-coherent and sum root mean square, while signal currents from the main and auxiliary PIN photodiodes are coherent and sum directly. Further, over a given design range, the steady state photocurrent of the auxiliary PIN photodiode does not contribute to the active sink current and, hence, does not produce additional shot noise in the active sink. The device of the figures thus utilizes a circuit topology in which the main PIN photodiode, D1, is operated in the reverse bias or photoresistive mode and the auxiliary PIN photodiode, D2, is operated in the photovoltaic mode. The active sink is typically a plurality of semiconductor devices such as transistors or integrated circuits. Further signal conditioning and amplification is provided by input stage Q2, cascode output Q3 and impedance converter Q4, respectively.

Figure 4:
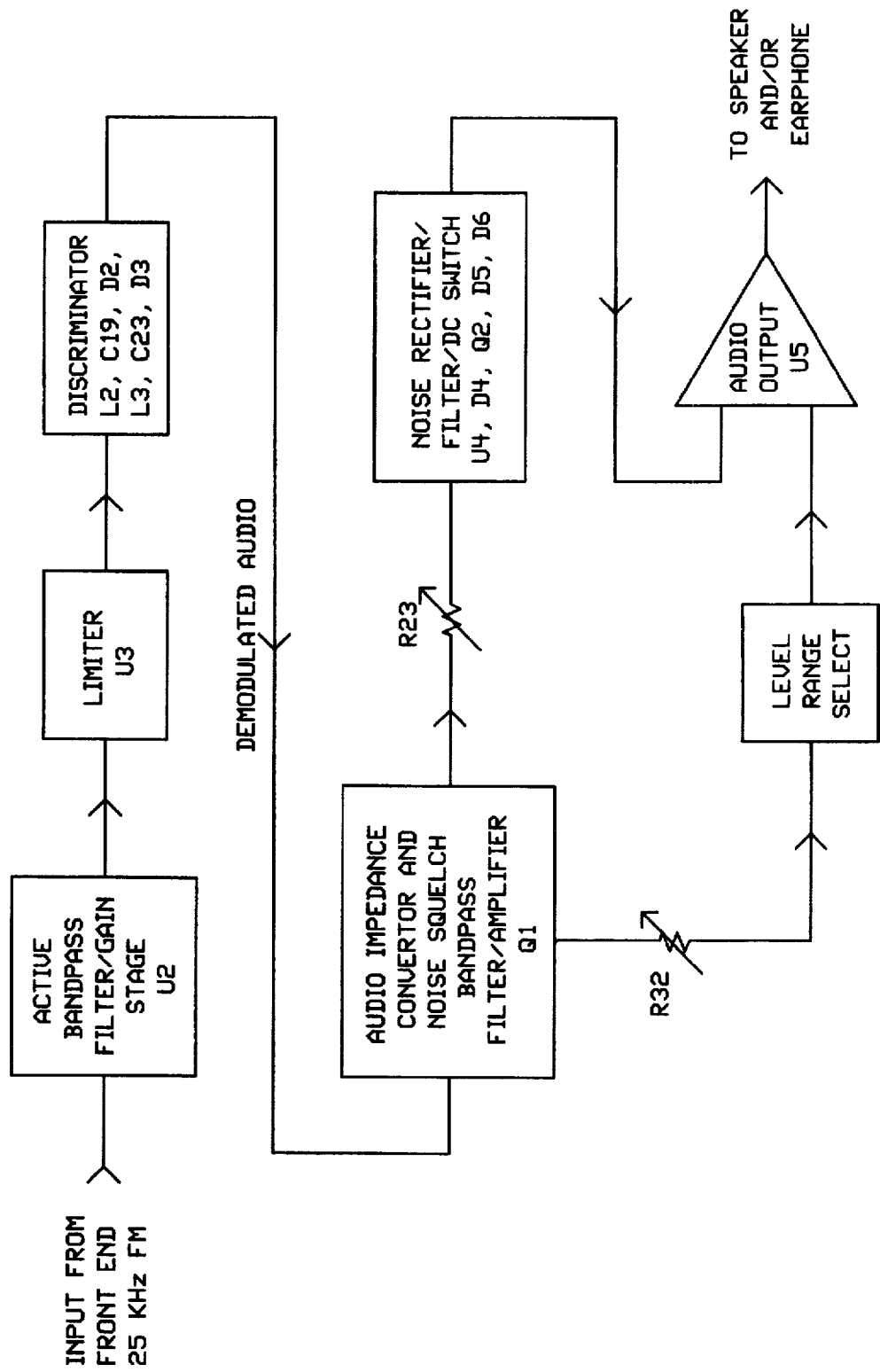
FIG. 4 is a block diagram of a means in the receiver of FIG. 3 for filtering and detecting the received signal and for squelching interference from ambient light energy (i.e., background noise).

The output from the impedance converter, Q4, is then directed to the tuned radio frequency FM receiver of FIG. 4. The resulting signal is conditioned by active bandpass filter/gain stage U2, limiter U3, and discriminator network made up of L2, C19, D2, L3, C23, and D3 (see FIG. 6A) which produces a demodulated audio signal. The demodulated audio signal is further conditioned by the audio impedance convertor and noise squelch bandpass filter/amplifier network of Q1 (see FIG. 6A for details of the network). Two signals are generated by the network of Q1 of FIGS. 2 and 6B.

Figure 6B:
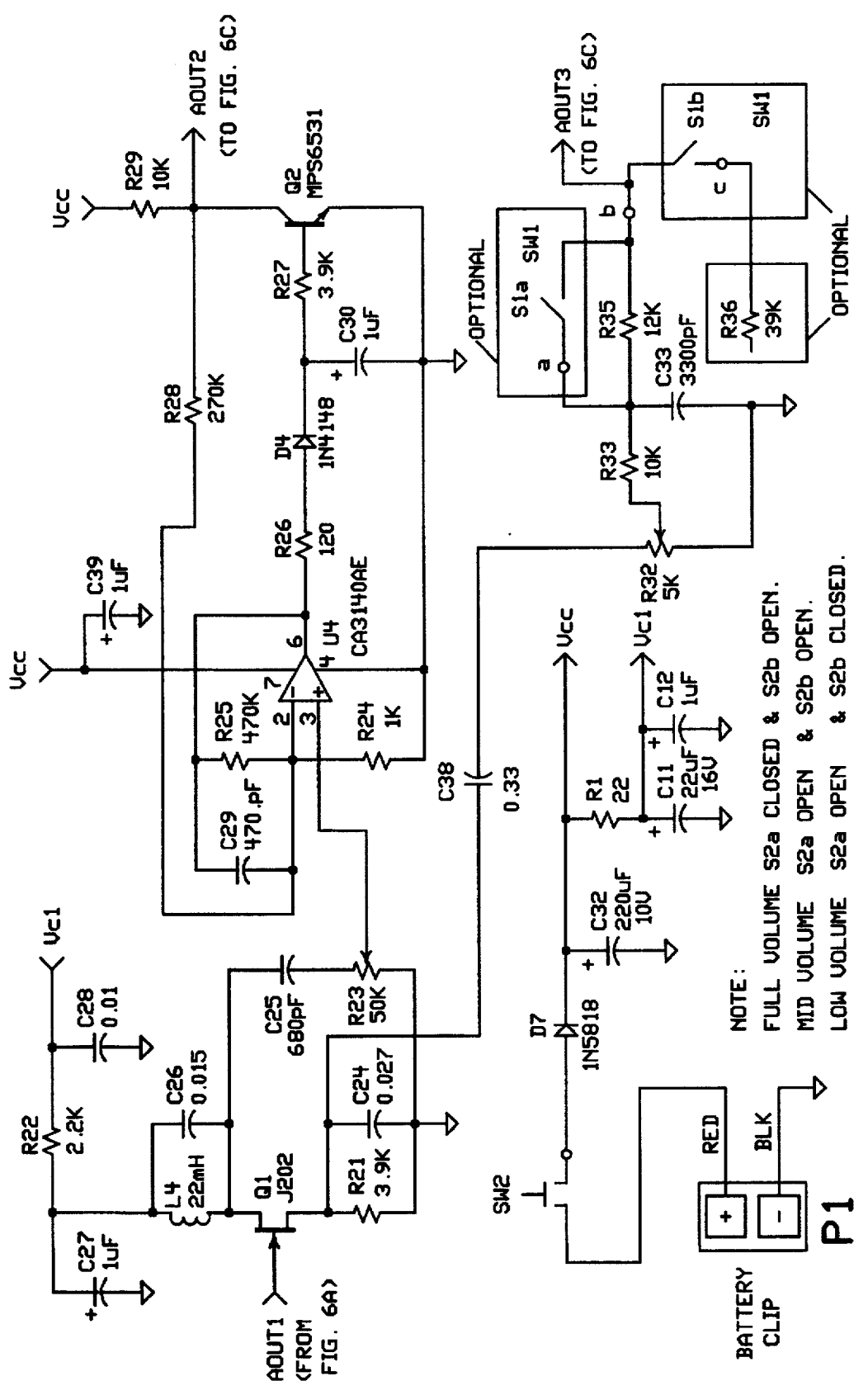
Figure 6C:
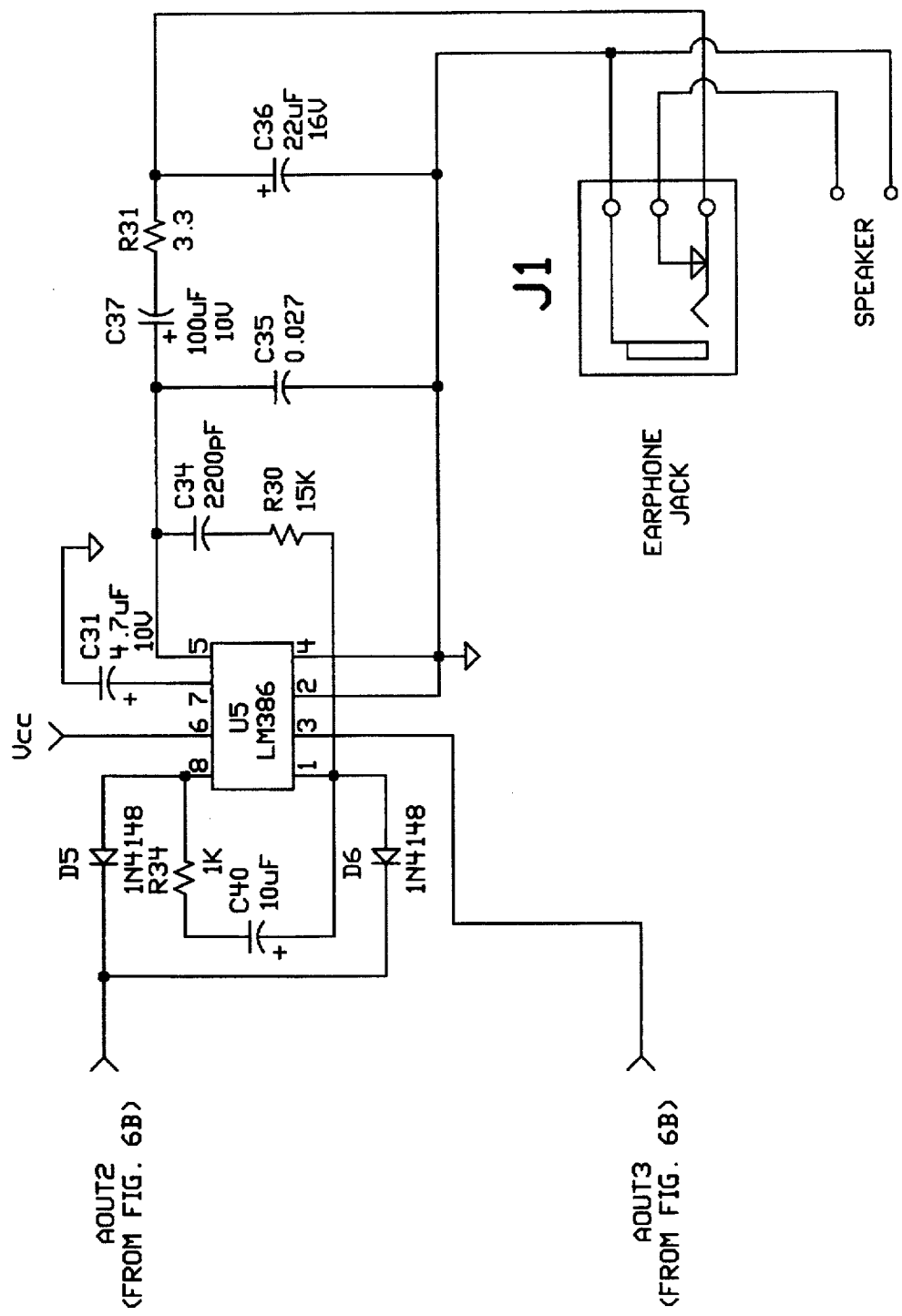

The first signal from Q1 of FIGS. 4 and 6B is a noise squelch signal which is directed via potentiometer R23 to the noise rectifier/filter/DC switch U4, D4, Q2, D5, and D6 (see FIGS. 6B and 6C for details of this network). The output of the noise rectifier/filter/DC switch which delivers the noise squelch level is then directed to the audio output amplifier U5.

The second signal from Q1 of FIGS. 4 and 6B is directed to a level range select network via potentiometer R32. The output from the level range select network is then directed to the audio output amplifier U5. The output from the audio output amplifier U5 is then used to actuate the speaker or other non-visual communicator.

Figure 3:
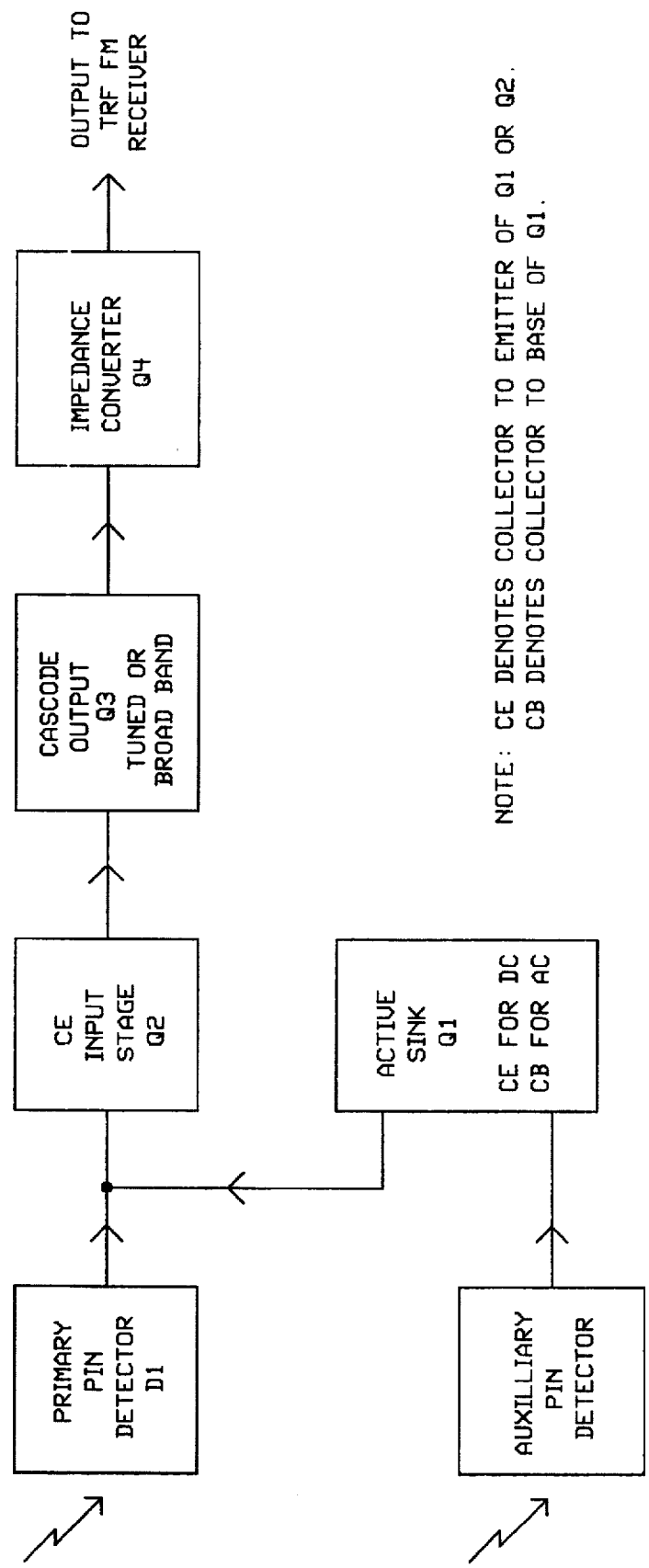
FIG. 3 is a block diagram of a typical front end (signal sensing and receiving portion) of an electronic receiver of this invention.

Complete details concerning the electronic circuitry referred to in FIGS. 3 and 4 are set forth in FIGS. 5 and 6A-6C, respectively.

A feature of this invention in preferred embodiments is that the electronic receiver includes an active sink (e.g., broad band semiconductor devices) for ambient light-induced steady-state detector photocurrent which effectively removes noise in the form of ambient background noise resulting from high ambient illumination such as sunlight or artificial lighting. The device is therefore capable of detecting a signal that approaches the shot noise detection limit of a PIN photodiode in the presence of a steady state photocurrent. In doing so the device in the form depicted in the figures converts the sensed signal from the array of single channel emitters into intelligible speech emanating from the speaker by converting the signal into an amplified time-varying detector signal photocurrent and delivering the amplified photocurrent to the speaker to actuate the same.

Preferably, the transmitters sending the signal to the preferred electronic receiver are those of this invention, so that the signal is adjusted by the transmitters to compensate for changes in ambient light energy (i.e., in light conditions, the signal strength increases, and in dark conditions, the signal strength decreases). This feature, in essence, compliments the filtering capability of the above-described receiver. Thus, when ambient background light energy is at a peak (i.e., in high ambient illumination conditions), the possibility that sensitivity of the electronic receiver to the desired signal may be diminished is countered by the fact that signal strength of the transmitter peaks concurrently and thus is more easily detected. Likewise, when the ambient background light energy is very low (i.e., in low ambient illumination conditions), sensitivity of the electronic receiver to the desired signal increases, and the signal strength of the transmitter adjusts downwardly concurrently, thereby preventing the transmission from exceeding the desired range.

The disclosure in each U.S. patent, in each U.S. patent application, and in any other publication cited herein is incorporated entirely herein by reference.

This invention is susceptible to considerable variation in its practice. Therefore, the foregoing description is not intended to limit, and should not be construed as limiting, the invention to the particular exemplifications presented hereinabove. Rather, what is intended to be covered is as set forth in the ensuing claims and the equivalents thereof permitted as a matter of law.

What is claimed is:

1. Apparatus for transmitting lightwave signals which comprises
   (a) an emitter for sending a frequency modulated lightwave signal of variable intensity,
   (b) a light energy receiver for detecting a change in the level of surrounding ambient light energy and for producing a response to such change in proportion to the change detected, and
   (c) a controller for adjusting, directly or indirectly, the frequency modulated lightwave signal in response to the light energy receiver response to the change detected.

2. Apparatus according to claim 1 wherein the light energy receiver comprises a photocell.

3. Apparatus according to claim 2 wherein the photocell is a cadmium sulfide photocell.

4. Apparatus according to claim 2 wherein the photocell has a resistance which is inversely proportional to the ambient light energy detected.

5. Apparatus according to claim 4 wherein the resistance is in the range of about 25 Kilohms to about 2 Megohms.

6. Apparatus according to claim 2 wherein the controller comprises a variable gain amplifier.

7. Apparatus according to claim 2 wherein the lightwave signals are infrared lightwave signals, and the emitter comprises one or more infrared diode arrays.

8. Apparatus according to claim 7 wherein the photocell is a cadmium sulfide photocell.

9. Apparatus according to claim 8 wherein the photocell has a resistance which is inversely proportional to the ambient light energy detected.

10. Apparatus according to claim 9 wherein the resistance is in the range of about 25 Kilohms to about 2 Megohms.

11. Apparatus according to claim 1 wherein the controller comprises a variable gain amplifier.

12. Apparatus according to claim 1 wherein the lightwave signals are infrared lightwave signals and the emitter comprises one or more infrared diode arrays.

13. An audio transmission system comprising
(a) a sound storage and retrieval device for controllably storing and transmitting an audio signal,
(b) a modulator for modulating the frequency of the audio signal to produce a modulated output signal,
(c) a light energy receiver for detecting a change in the level of surrounding ambient light energy and for producing a response to such change in proportion to the change detected,
(d) a controller for adjusting the frequency modulated output signal in response to the light energy receiver response to the change detected, and
(e) an emitter for converting the adjusted, frequency modulated output signal into a frequency modulated lightwave signal.

14. A system according to claim 13 wherein the light energy receiver comprises a photocell.

15. A system according to claim 14 wherein the photocell is a cadmium sulfide photocell.

16. A system according to claim 14 wherein the photocell has a resistance which is inversely proportional to the level of ambient light energy detected.

17. A system according to claim 16 wherein the resistance is in the range of about 25 Kilohms to about 2 Megohms.

18. A system according to claim 14 wherein the controller comprises a variable gain amplifier.

19. A system according to claim 14 wherein the lightwave signals are infrared lightwave signals, and the emitter comprises one or more infrared diode arrays.

20. A system according to claim 19 wherein the photocell is a cadmium sulfide photocell.

21. A system according to claim 20 wherein the photocell has a resistance which is inversely proportional to the level of ambient light energy detected.

22. A system according to claim 21 wherein the resistance is in the range of about 25 Kilohms to about 2 Megohms.

23. A system according to claim 13 wherein the controller comprises a variable gain amplifier.

24. A system according to claim 13 wherein the lightwave signals are infrared lightwave signals and the emitter comprises one or more infrared diode arrays.

25. A system according to claim 13 further comprising at least one electronic receiver for receiving the lightwave signal and converting it into sound.

26. A system according to claim 25 wherein the electronic receiver comprises a non-visual communicator, a self-contained source of electrical energy, a detector for receiving the lightwave signal, and electronics comprising an active sink for ambient light-induced steady state detector photocurrent, a primary PIN photodiode operated in the photoresistive mode, and a secondary PIN photodiode operated in the photovoltaic mode, the electronics converting the sensed signal into intelligible non-visual communication emanating from the communicator both in the presence and in the absence of an ambient background of light energy, and the electronic receiver being effective as the sensed signal approaches the shot noise detection limit of the primary PIN photodiode in the presence of a steady state photocurrent.

27. A system according to claim 26 wherein the electronic receiver is a portable directional receiver.

28. A system according to claim 25 wherein the sensing means comprises a photocell.

29. A system according to claim 28 wherein the photocell is a cadmium sulfide photocell.

30. A system according to claim 28 wherein the photocell has a resistance which is inversely proportional to the level of ambient light energy detected.

31. A system according to claim 30 wherein the resistance is in the range of about 25 Kilohms to about 2 Megohms.

32. A system according to claim 28 wherein the control means further comprises a variable gain amplifier.

33. A system according to claim 28 wherein the lightwave signals are infrared lightwave signals, and the emitter comprises one or more infrared diode arrays.

34. A system according to claim 33 wherein the photocell is a cadmium sulfide photocell.

35. A system according to claim 34 wherein the photocell has a resistance which is inversely proportional to the ambient light energy detected.

36. A system according to claim 35 wherein the resistance is in the range of about 25 Kilohms to about 2 Megohms.

37. A system according to claim 25 wherein the control means further comprises a variable gain amplifier.

38. A system according to claim 25 wherein the lightwave signals are infrared lightwave signals and the emitter comprises one or more infrared diode arrays.

* * * * *